United States Patent
Evangelides, Jr. et al.

(10) Patent No.: US 7,869,708 B2
(45) Date of Patent: Jan. 11, 2011

(54) COTDR ARRANGEMENT WITH SWEPT FREQUENCY PULSE GENERATOR FOR AN OPTICAL TRANSMISSION SYSTEM

(75) Inventors: Stephen G. Evangelides, Jr., Red Bank, NJ (US); Jonathan A. Nagel, Brooklyn, NY (US)

(73) Assignee: Huawei Marine Networks Co., Ltd., Tianjin (CN)

( * ) Notice: Subject to any disclaimer, the term of this patent is extended or adjusted under 35 U.S.C. 154(b) by 1255 days.

(21) Appl. No.: 10/794,174

(22) Filed: Mar. 5, 2004

(65) Prior Publication Data

US 2005/0196174 A1    Sep. 8, 2005

(51) Int. Cl.
  *H04B 10/08* (2006.01)
(52) U.S. Cl. .............................. 398/21; 398/33; 398/151
(58) Field of Classification Search ............. 398/20–21, 398/28–30, 33, 37, 84, 151; 356/73.1
  See application file for complete search history.

(56) References Cited

U.S. PATENT DOCUMENTS

| | | | |
|---|---|---|---|
| 5,539,560 A * | 7/1996 | Dennis et al. ................. | 398/49 |
| 5,546,483 A * | 8/1996 | Inoue et al. ................... | 385/14 |
| 5,686,986 A * | 11/1997 | Li et al. ....................... | 356/73.1 |
| 5,737,105 A * | 4/1998 | Ohta et al. .................... | 398/18 |
| 5,844,235 A | 12/1998 | Tachikawa et al. ..... | 250/227.14 |
| 6,002,820 A * | 12/1999 | Nitta ........................... | 385/24 |
| 6,301,036 B1 * | 10/2001 | Spencer ....................... | 398/31 |
| 2002/0044314 A1* | 4/2002 | Michishita .................. | 359/110 |
| 2004/0146305 A1* | 7/2004 | Neubelt et al. .............. | 398/173 |
| 2004/0218850 A1* | 11/2004 | Peters ......................... | 385/14 |
| 2005/0140984 A1* | 6/2005 | Hitzenberger ............... | 356/497 |

* cited by examiner

*Primary Examiner*—Dzung D Tran
(74) *Attorney, Agent, or Firm*—Leydig, Voit & Mayer, Ltd.

(57) ABSTRACT

A method and apparatus is provided for obtaining status information from a given location along an optical transmission path. The method begins by generating a cw probe signal having a prescribed frequency that is swept over a prescribed frequency range. The cw probe signal is transmitted over the optical path and a returned COTDR signal in which status information concerning the optical path is embodied is received over the optical path. A receiving frequency within the prescribed frequency range of the returned COTDR signal is detected to obtain the status information. The detecting step includes the step of sweeping the receiving frequency at a rate equal to that of the prescribed frequency. A period associated with the receiving frequency is temporally offset from a period associated with the prescribed frequency.

17 Claims, 8 Drawing Sheets

COTDR ARRANGEMENT WITH SWEPT FREQUENCY PULSE GENERATOR FOR AN OPTICAL TRANSMISSION SYSTEM

RELATED APPLICATIONS

This application is related to U.S. application Ser. No. 10/794,174 filed Mar. 5, 2004, entitled "OTDR Arrangement With Swept Frequency Pulse Generator For An Optical Transmission System," which is incorporated herein by reference in its entirety.

FIELD OF THE INVENTION

The present invention relates generally to optical transmission systems, and more particularly to the use of an arrangement to allow coherent optical time domain reflectometry (COTDR) to be used to detect faults in the optical transmission path of an optical transmission system consisting of multiple spans of fiber and optical amplifiers.

BACKGROUND OF THE INVENTION

A typical long-range optical transmission system includes a pair of unidirectional optical fibers that support optical signals traveling in opposite directions. An optical signal is attenuated over long distances. Therefore, the optical transmission line will typically include repeaters that restore the signal power lost due to fiber attenuation and are spaced along the transmission line at some appropriate distance from one another. The repeaters include optical amplifiers. The repeaters also include an optical isolator that limits the propagation of the optical signal to a single direction.

In long-range optical transmission links it is important to monitor the health of the system. For example, monitoring can detect faults or breaks in the fiber optic cable, localized increases in attenuation due to sharp bends in the cable, or the degradation of an optical component. Amplifier performance must also be monitored. For long haul undersea cables there are two basic approaches to in-service monitoring: monitoring that is performed by the repeaters, with the results being sent to the shore station via a telemetry channel, and shore-based monitoring in which a special signal is sent down the line and is received and analyzed for performance data. Coherent optical time domain reflectometry (COTDR) is one shore-based technique used to remotely detect faults in optical transmission systems. In COTDR, an optical pulse is launched into an optical fiber and backscattered signals returning to the launch end are monitored. In the event that there are discontinuities such as faults or splices in the fiber, the amount of backscattering generally changes and such change is detected in the monitored signals. Backscattering and reflection also occur from discrete elements such as couplers, which create a unique signature. The link's health or performance is determined by comparing the monitored COTDR with a reference record. New peaks and other changes in the monitored signal level being indicative of changes in the fiber path, normally indicating a fault.

One complication that occurs when COTDR is used in a multi-span transmission line in which the individual spans are concatenated by repeaters is that the optical isolators located downstream from each repeater prevent the backscattered signal from being returned along the same fiber on which the optical pulse is initially launched. To overcome this problem each repeater includes a bidirectional coupler connecting that repeater to a similar coupler in the opposite-going fiber, thus providing an optical path for the backscattered light so that it can be returned to the COTDR unit. In most DWDM links employing such a return path there may also be a filter immediately following the coupler so that only the COTDR signal is coupled onto the return path, thus avoiding interference that would occur if the signals from one fiber were coupled onto the return path fiber) Thus, signals generated by the backscattering and reflection of a COTDR pulse launched on one fiber are coupled onto the opposite-going fiber to be returned to the COTDR unit for analysis.

The time between pulse launch and receipt of a backscattered signal is proportional to the distance along the fiber to the source of the backscattering, thus allowing the fault to be located. Accordingly, the duty cycle of the pulses must be greater than their individual round trip transit times in the transmission line to obtain an unambiguous return signal. To obtain high spatial resolution the pulses are typically short in duration (e.g., between a few and tens of microseconds) and high in intensity (e.g., tens of milliwatts peak power) to get a good signal to noise ratio.

The previously mentioned two features of the COTDR pulse, high power and low duty cycle, generally make COTDR unacceptable for use when the transmission system is in-service (i.e., when it is carrying customer traffic). This is because the high power COTDR pulses can interact with the channels supporting traffic via four wave mixing (FWM) or cross phase modulation (XPM). Moreover, XPM from the customer traffic channels can also broaden the COTDR pulse width enough to remove a significant amount of its energy out of the original signal bandwidth. Since the COTDR receiver has quite a narrow bandwidth, some of the power in the COTDR signal will be lost as it traverses the receiver, thereby lowering its optical signal-to-noise-ratio (OSNR) and significantly impairing the COTDR sensitivity. The problems caused by FWM and XPM can be alleviated by locating the COTDR at a wavelength that is sufficiently far from the nearest signal wavelength. For example, one analysis shows that a separation of about 0.8 nm is sufficient to adequately reduce FWM and another analysis shows that a separation of about 1.6 nm will reduce XPM to acceptably low levels. However, the appropriate separation generally will depend on the specifics of the dispersion map, the system length and the customer traffic signal levels. Another reason why it is problematic to use COTDR in-service is because the COTDR pulses give rise to gain fluctuations that cause transient behavior in the optical amplifiers. This in turn effects the signal carrying channels. In general this effect is known as cross gain coupling. The optical amplifiers generally use erbium as the active element to supply gain. The optical amplifiers treat the COTDR pulses as transients because the duty cycle of the COTDR pulses (for any transmission span of realistic length) is longer than the lifetime of the erbium ions in their excited state, which defines the characteristic response time of the amplifier. (Such transient behavior will also occur if Raman optical amplifiers or semiconductor optical amplifiers are employed, since they have characteristic lifetimes on the order of femtoseconds, and nanoseconds, respectively). For example, the round-trip travel time for a COTDR pulse in a 500 km transmission span is approximately 5 milliseconds, whereas the erbium lifetime is approximately 300 microseconds. Since the time between COTDR pulses is much greater than the response time of the optical amplifier, the presence of a COTDR pulse along with the traffic will cause transient behavior in the amplifier.

The transient behavior of the optical amplifier caused by the COTDR pulse manifests itself as a reduction in gain and a change in gain tilt. The gain is reduced because optical amplifiers are typically operated in a state of gain saturation or compression in which an increase in optical input power is compensated by a decrease in amplifier gain (and visa versa). Gain tilt refers to the change in gain that arises from a change in signal wavelength. If the gain increases with signal wavelength the gain tilt is said to have a positive slope. If the gain decreases with signal wavelength the gain tilt is said to have a negative slope. The gain tilt of the optical amplifier changes as a result of the transient behavior because its gain tilt is in large part determined by its gain level. At a relatively low gain, the gain tilt is positive, whereas at a high value of gain the gain tilt is negative.

The gain change that arises in a single optical amplifier as a result of a COTDR pulse with typical values for its peak power and duration may be acceptable under many circumstances. However, when such a gain change occurs at every optical amplifier along the transmission path, the cumulative effect becomes problematic. The signal degradation that results generally will be unacceptable for a system that does not build in extra margin specifically for this type of degradation.

Accordingly, it would be desirable to provide a method and apparatus for performing COTDR in an optical transmission system by reducing transient gain fluctuations caused by the COTDR pulse.

SUMMARY OF THE INVENTION

In accordance with the present invention, a method and apparatus is provided for obtaining status information from a given location along an optical transmission path. The method begins by generating a cw probe signal having a prescribed frequency that is swept over a prescribed frequency range. The cw probe signal is transmitted over the optical path and a returned COTDR signal in which status information concerning the optical path is embodied is received over the optical path. A receiving frequency within the prescribed frequency range of the returned COTDR signal is detected to obtain the status information. The detecting step includes the step of sweeping the receiving frequency at a rate equal to that of the prescribed frequency. A period associated with the receiving frequency is temporally offset from a period associated with the prescribed frequency.

In accordance with one aspect of the invention, the temporal offset is equal to a round trip transit time experienced by the cw probe signal traveling to the given location along the optical transmission path that is to be monitored.

In accordance with another aspect of the invention, the prescribed frequency range is equal to the product of a sweep rate at which the frequency of the cw probe signal is varied and the period associated with the prescribed frequency.

In accordance with another aspect of the invention, the optical traffic signals are transmitted over the optical path while the cw probe signal is transmitted over the optical path.

In accordance with another aspect of the invention, the traffic signals are located at one or more wavelengths outside of a waveband occupied by the cw probe signal.

In accordance with another aspect of the invention, the traffic signals are located at one or more wavelengths sufficiently remote from a waveband occupied by the cw probe signal to reduce FWM and XPM so that both the quality of the optical traffic signals and COTDR sensitivity are maintained at acceptable levels.

In accordance with another aspect of the invention, the transmission path includes at least one optical amplifier located therein.

In accordance with another aspect of the invention, a method is provided for using COTDR with a bidirectional optical transmission system that includes first and second terminals interconnected by at least first and second unidirectional optical transmission paths having at least one repeater therein. The method begins by generating a cw probe signal having a frequency that is swept over a prescribed frequency range in a prescribed time period and transmitting the cw probe signal over the first optical path. A returned COTDR signal in which status information concerning the first optical path is embodied is received over the second optical path. A predetermined frequency is detected within the prescribed frequency range of the returned COTDR signal to obtain status information. The detecting step includes the step of sweeping the predetermined frequency at a rate equal to that of the cw probe signal. A period associated with the predetermined frequency is temporally offset from a period associated with the cw probe signal.

In accordance with another aspect of the invention, a COTDR arrangement is provided for obtaining status information concerning an optical transmission path. The arrangement includes a cw light source for generating a cw probe signal having a frequency that is swept over a prescribed frequency range in a prescribed time period. The arrangement also includes an optical receiver for receiving over the optical path a returned COTDR signal in which status information concerning the optical path is embodied and for detecting a predetermined frequency within the prescribed frequency range of the returned COTDR signal to obtain the status information. The optical receiver includes a frequency modulator for sweeping the predetermined frequency detected by the optical receiver at a rate equal to that of the cw probe signal. A period associated with the predetermined frequency is temporally offset from a period associated with the cw probe signal.

In accordance with another aspect of the invention, an arrangement is provided for obtaining status information concerning an optical transmission path. The arrangement includes a cw light source for generating a cw probe signal having a frequency that is swept over a prescribed frequency range in a prescribed time period. The arrangement also includes an optical receiver for receiving over the optical path a backscattered and reflected signal in which status information concerning the optical path is embodied and for detecting a predetermined frequency within the prescribed frequency range of the backscattered and reflected signal to obtain the status information.

DETAILED DESCRIPTION OF THE INVENTION

The present invention overcomes the aforementioned problems and limitations of conventional COTDR arrangements that arise from gain fluctuations associated with the long duty cycle of the COTDR probe pulses. Instead of a pulse generator that launches long duty cycle probe pulses, the present invention employs a CW laser having an output frequency that is swept over an appropriate range. As explained in more detail below, the COTDR receiver has a fixed frequency local oscillator that is sensitive to a single frequency swept by the CW laser.

One important advantage of the present invention is that because the COTDR arrangement employs a cw laser instead of a pulsed source, the optical power level "seen" by the optical amplifiers will remain constant in time when the COTDR arrangement is in use. Accordingly, gain fluctuations and the associated signal degradations due to cross gain coupling will not arise, thereby allowing the COTDR arrangement to be used when the transmission system is in-service.

Figure 1:
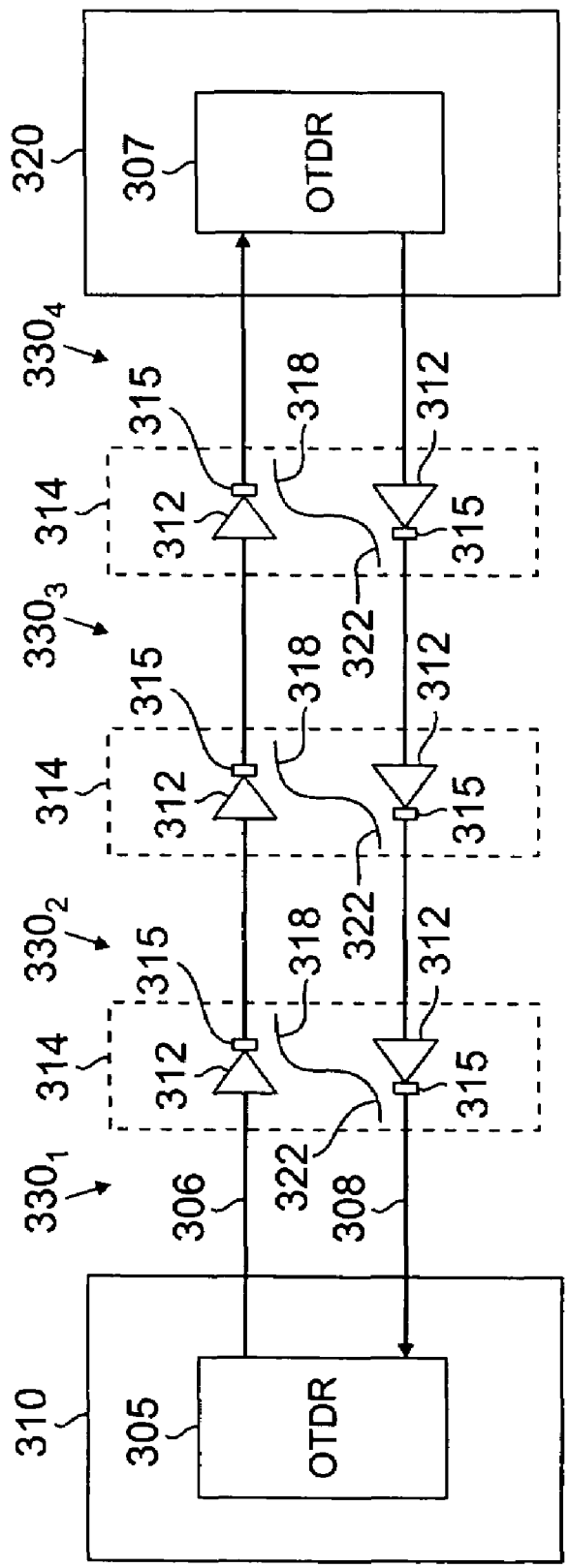
FIG. 1 shows a simplified block diagram of a transmission system that employs a COTDR arrangement in accordance with the present invention.

FIG. 1 shows a simplified block diagram of an exemplary wavelength division multiplexed (WDM) transmission system in accordance with the present invention. The transmission system serves to transmit a plurality of optical channels over a pair of unidirectional optical fibers 306 and 308 between terminals 310 and 320, which are remotely located with respect to one another. Terminals 310 and 320 each include a transmitting and receiving unit (not shown). The transmitting unit generally includes a series of encoders and digital transmitters connected to a wavelength division multiplexer. For each WDM channel, an encoder is connected to an optical source, which, in turn, is connected to the wavelength division multiplexer. Likewise, the receiving unit includes a series of decoders, digital receivers and a wavelength division demultiplexer. Each terminal 310 and 320 includes a COTDR unit 305 and 307, respectively.

Optical amplifiers 312 are located along the fibers 306 and 308 to amplify the optical signals as they travel along the transmission path. The optical amplifiers may be rare-earth doped optical amplifiers such as erbium doped fiber amplifiers that use erbium as the gain medium. As indicated in FIG. 1, a pair of rare-earth doped optical amplifiers supporting opposite-traveling signals is often housed in a single unit known as a repeater 314. The transmission path comprising optical fibers 306–308 are segmented into transmission spans $330_1$–$330_4$, which are concatenated by the repeaters 314. While only three repeaters 314 are depicted in FIG. 1 for clarity of discussion, it should be understood by those skilled in the art that the present invention finds application in transmission paths of all lengths having many additional (or fewer) sets of such repeaters. Optical isolators 315 are located downstream from the optical amplifiers 220 to eliminate backwards propagating light and to eliminate multiple path interference.

Each repeater 314 includes a coupler arrangement providing an optical path for use by the COTDR. In particular, signals generated by reflection and scattering of the probe signal on fiber 306 between adjacent repeaters enter coupler 318 and are coupled onto the opposite-going fiber 308 via coupler 322. The COTDR signal then travels along with the data on optical fiber 308. COTDR 307 operates in a similar manner to generate COTDR signals that are reflected and scattered on fiber 308 so that they are returned to COTDR 307 along optical fiber 306. The signal arriving back at the COTDR is then used to provide information about the loss characteristics of each span.

Figure 2:
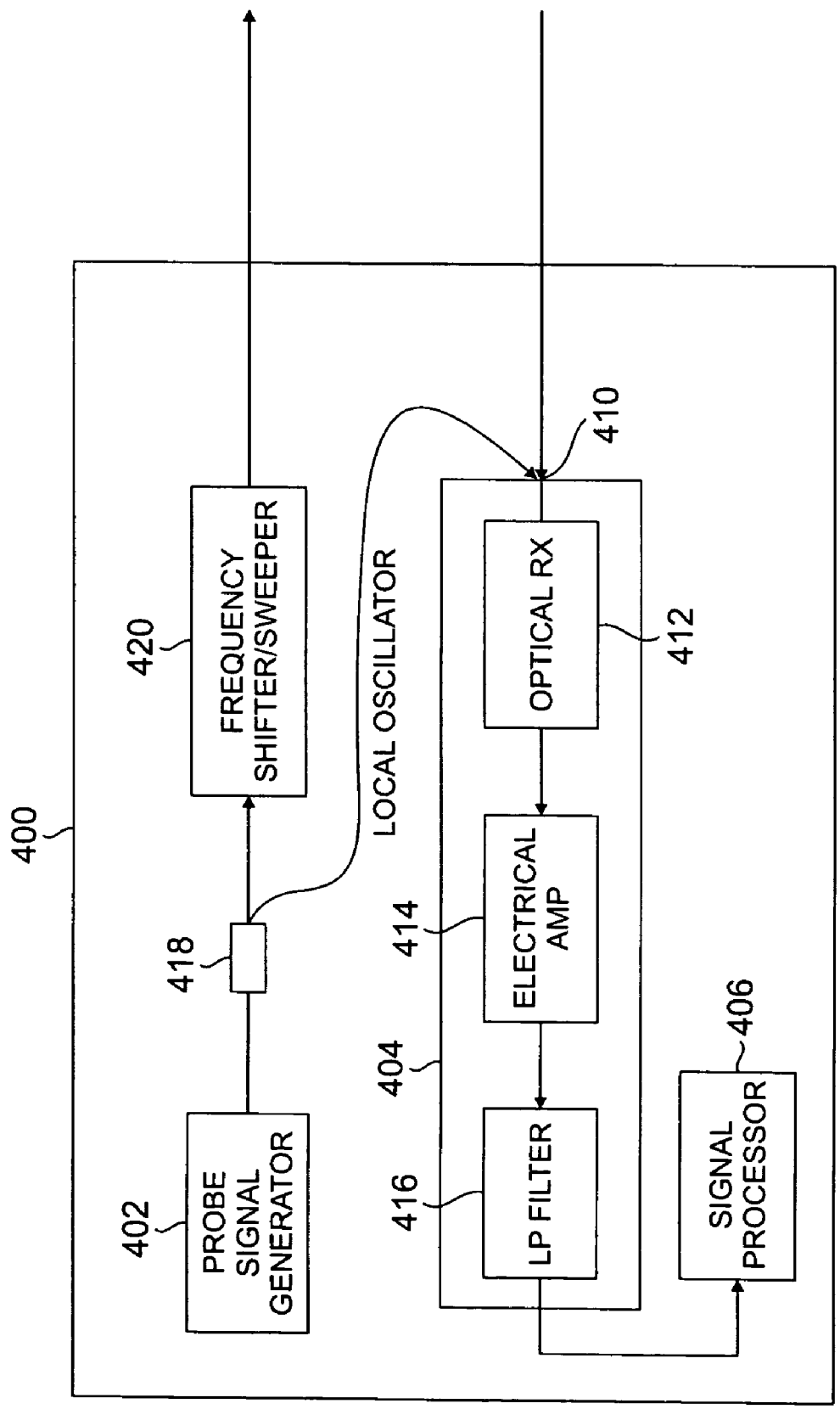
FIG. 2 is a block diagram showing one embodiment of a COTDR arrangement constructed in accordance with the present invention.

FIG. 2 shows one embodiment of COTDR units 305 and 307. As shown, COTDR unit 400 includes a COTDR probe signal generator 402, a modulator 420 to sweep the probe signal frequency, an optical homodyne detection type optical receiver 404, and signal processor 406. Optical homodyne detection type optical receiver 404 includes an optical fiber coupler 410, an optical receiver 412, an electrical amplifier 414, and a low pass filter 416. The branch port of the optical fiber coupler 410 and the branch port of the optical fiber coupler 418 are connected to each other.

In operation, the backscattered and reflected COTDR signal received on either optical fiber 306 or 308 (see FIG. 1) is delivered to COTDR 400 and is received by the optical homodyne detection type optical receiver 410. In the optical homodyne detection type optical receiver 410, the backward-scattered probe light is mixed by the optical fiber coupler 410 with an oscillating light branched from the probe signal generator 402 by the optical fiber coupler 418, subjected to square-law detection by the optical receiver 412, and converted into a baseband signal having intensity information on the probe pulses. The photoelectrically converted baseband signal deriving from the probe signal is amplified by the electrical amplifier 414, and reduced of its noise content by the low pass filter 416. Then the signal processor 406 computes the reflecting position of the probe signal on the optical fiber from the arrival time of the homodyne detection signal and the loss characteristic of the optical fiber from the level of the homodyne detection signal. The method of measuring the optical fibers using the probe light signal is that of the optical time domain reflectometer (COTDR) by a coherent method.

Figure 3:
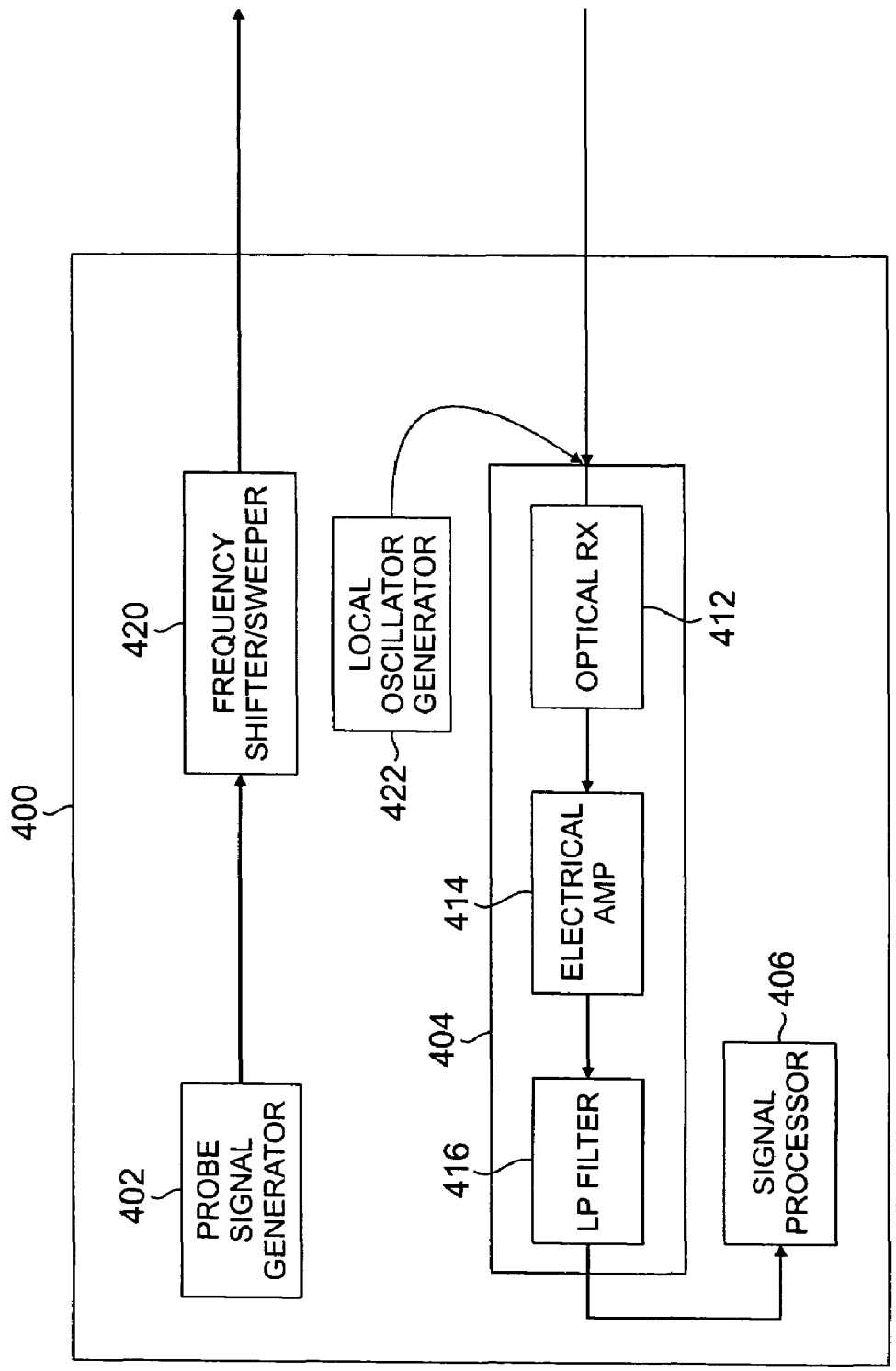
FIG. 3 is a block diagram showing an alternative embodiment of a COTDR arrangement constructed in accordance with the present invention.

In one alternative embodiment of the invention shown in FIG. 3, a separate local oscillator generator 422 is provided so that it is not necessary to use optical couplers 410 and 418 to provide the local oscillator signal to the receiver 404. In FIGS. 2 and 3, as well as the figures that follow, like reference numerals refer to like elements.

Figure 4:
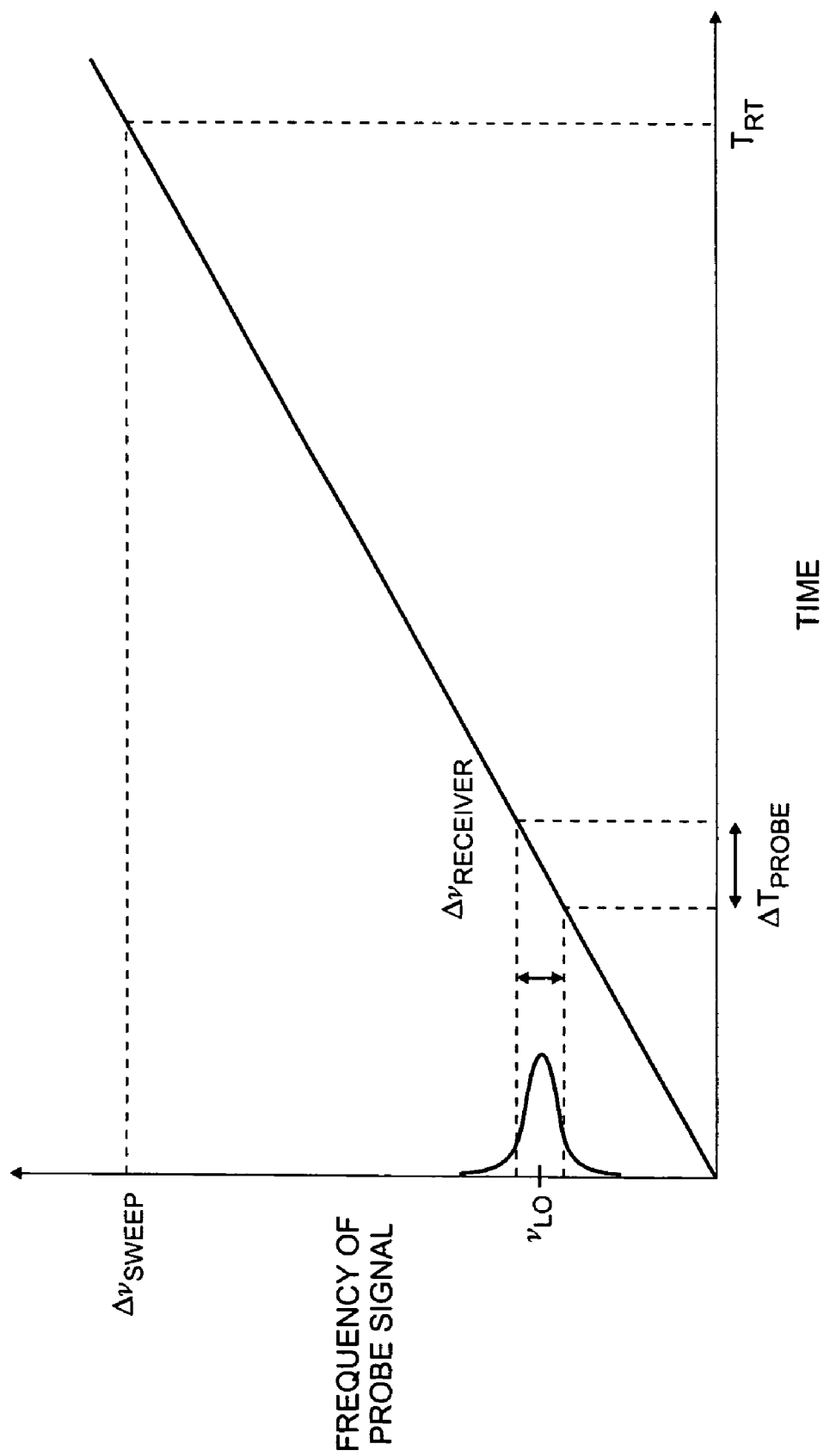
FIG. 4 shows the frequency of the CW probe signal as a function of time.

As previously mentioned, in the present invention the COTDR probe signal generator 402 is a cw light source such as a laser having a frequency that is swept in time over an appropriate frequency range. FIG. 4 shows the frequency of the probe signal as it is swept in time. As shown, the frequency is swept over a range $\Delta v_{Sweep}$ in a time period $T_{RT}$. The time period $T_{RT}$ is equal to the round trip time that a pulse would need to traverse a particular transmission line. In this way the optical receiver 410 will only detect those portions of the cw beam that define pulses separated in time by the period $T_{RT}$.

If the sweep rate of the cw source is $$\frac{\partial v}{\partial t},$$

the bandwidth over which the receiver is sensitive is $\Delta v_{Receiver}$, and the effective width or duration of the detected probe pulses is defined as $\Delta T_{Probe}$, then $$\frac{dv}{dt} \times \Delta T_{Probe} = \Delta v_{Receiver}$$

Also, as seen from FIG. 4, $$\frac{dv}{dt} \times T_{RT} = \Delta v_{sweep}$$

and $$T_{RT} = \frac{nL}{c}$$

where n is the refractive index experienced by the light in the optical fiber, L is the round trip distance in the transmission line being monitored, and c is the speed of light.

The amount of bandwidth required by this technique corresponds to the frequency range $\Delta v_{sweep}$ over which the frequency is swept. The required bandwidth can be estimated by using the following representative values: $\Delta v_{Receiver}$=5 MHz, L=1000 km, $\Delta T_{Probe}$=20 μs and n=1.5 then $$\frac{\partial v}{\partial t} = 0.25 \times 10^{12} \text{ Hz/sec.}$$

Hz/sec. Based on these numbers, a bandwidth $\Delta v_{Sweep}$ of 2.5 GHz required, which is quite modest in relation to the total available bandwidth in most systems. The probe pulse duration should be variable so that the resolution can be adjusted to suit the situation (probe pulse durations of from 8 μs to 40 μs are generally required). Given these values, a 2000 km link will require at most abut 0.1 nm of bandwidth to accommodate the swept signal. This is an insignificant amount of bandwidth today when most DWM long haul systems have 25 to 30 nm of available bandwidth. Even for a transmission length of 4000 km the required bandwidth is only about 0.2 nm.

Figure 5:
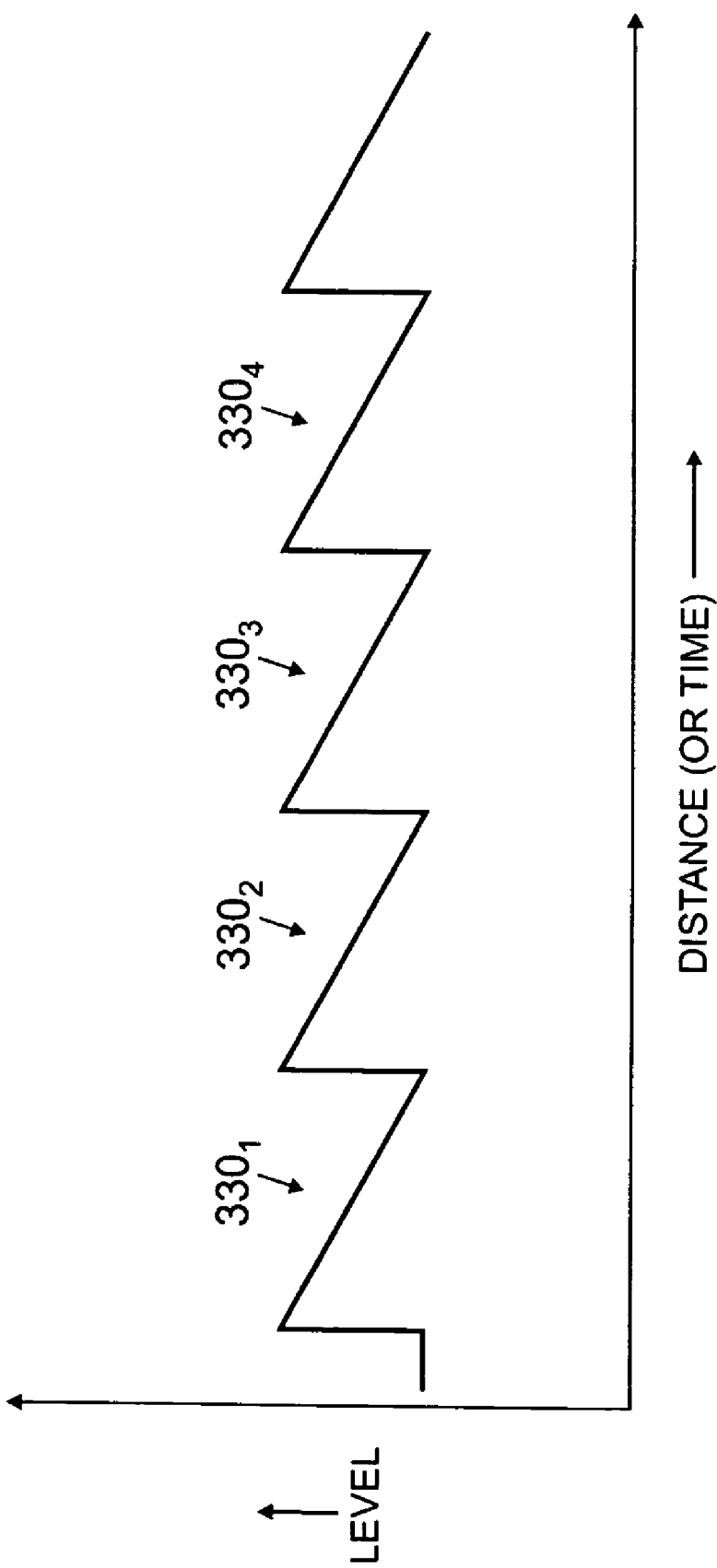
FIG. 5 shows a typical trace of the backscattered and reflected signal on a logarithmic scale versus the distance from the COTDR unit for the transmission spans depicted in FIG. 1.

FIG. 5 shows a typical trace of the backscattered and reflected signal on a logarithmic scale versus the distance from the COTDR unit for the transmission spans $330_1$–$330_4$ depicted in FIG. 1. The signal to noise ratio of a single backscattered and reflected signal such as shown in FIG. 5 is generally quite low. The reasons for this are two-fold. First, the returned signal itself is reduced in power by about 20 dB from the launch power of the outgoing probe signal. Second, the two directional couplers traversed by the returned signal in the coupler arrangement that conveys the returned signal to the opposite-going transmission path (e.g., couplers 315 in FIG. 1) each contribute about another 10 dB of loss. Moreover, the returned signal is further attenuated by the optical fiber that is being monitored. Another problem contributing to the low fidelity of the backscattered and reflected signal is that noise in the form of amplified spontaneous emission (ASE) accumulates in both the outgoing probe signal and returned signal. To increase the signal to noise ratio, many returned signals are generally averaged together. Typically, about 100 to 1000 returned signals are averaged. Accordingly, a single returned signal only provides a relatively crude picture of the entire transmission line's status.

In another embodiment of the invention, instead of monitoring the status of the entire transmission line as discussed above, only a single location along the line may be examined. In this embodiment a single location can be monitored much more quickly because the number of signal samples received per probe signal sweep is effectively increased. This is accomplished by sweeping the local oscillator of the receiver at the same rate as the probe signal. However, the frequency sweep of the local oscillator is delayed in time by an amount equal to the round trip time of the probe signal from launch to the portion of the line that is to be monitored. In this way the whole swept frequency probe that is backscattered from the location of interest will be received. This equivalent to the detection of many returned signals from the same location of interest using the aforementioned embodiment of the invention in which the receiver has a fixed frequency local oscillator. Thus, by sweeping the frequency detected by the receiver, the returned signals can be averaged in a much faster time frame to obtain a significantly higher signal-to-noise ratio.

Figure 6:
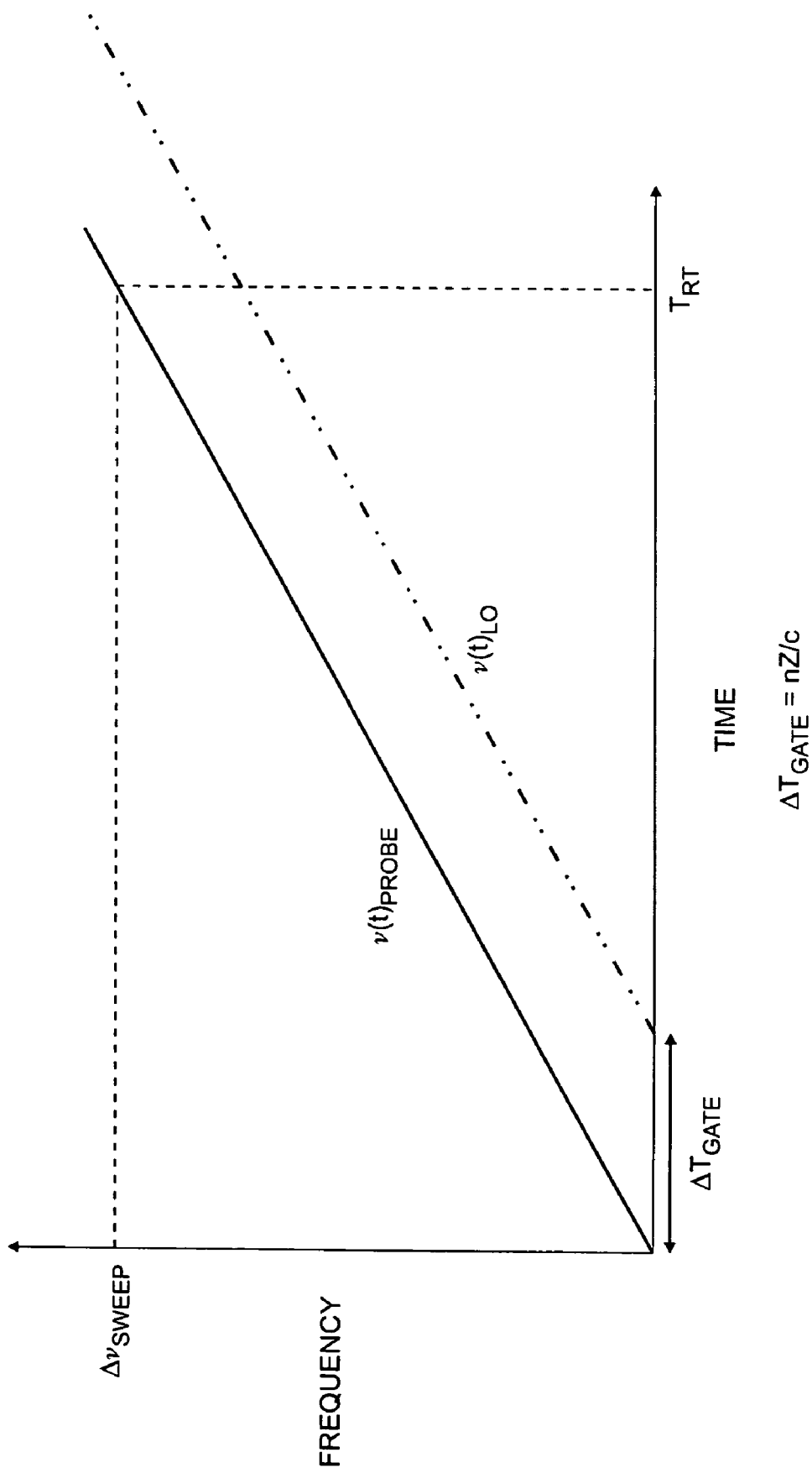
FIG. 6 shows the frequency of the signal detected by the optical receiver as a function of time in accordance with an alternative embodiment of the invention.

FIG. 6 shows the frequency $v(t)_{probe}$ of the probe signal as it is swept in time, which is the same as that shown in FIG. 4. FIG. 6, however, also shows the frequency $v(t)_{LO}$ of the receiver's local oscillator. As shown, the receiver's local oscillator is swept at the same rate as the probe signal. However, the local oscillator is delayed in time by an amount $\Delta T_{gate}$:

$$\Delta T_{gate} = 2xnZ/c$$

where Z is the distance to the portion of the line that is to be monitored, c is the speed of light and n is the refractive index of the fiber in the transmission line. If in this way the sweep of the receiver's local oscillator begins at a time $\Delta T_{gate}$ after the probe signal is launched, the receiver will only detect the returned signal from location Z along the line. The duration of the returned signal will be TRT rather than $\Delta T_{probe}$, which is an increase in duration equal to the duty cycle of the probe signals. For example, if a pulse 8 ms in width is used in a transmission line 1000 km in length, the duty cycle will be 1250:1. Thus, in one sweep alone a signal is received that can be averaged to provide a highly accurate measure of the loss at the location Z.

Figure 7:
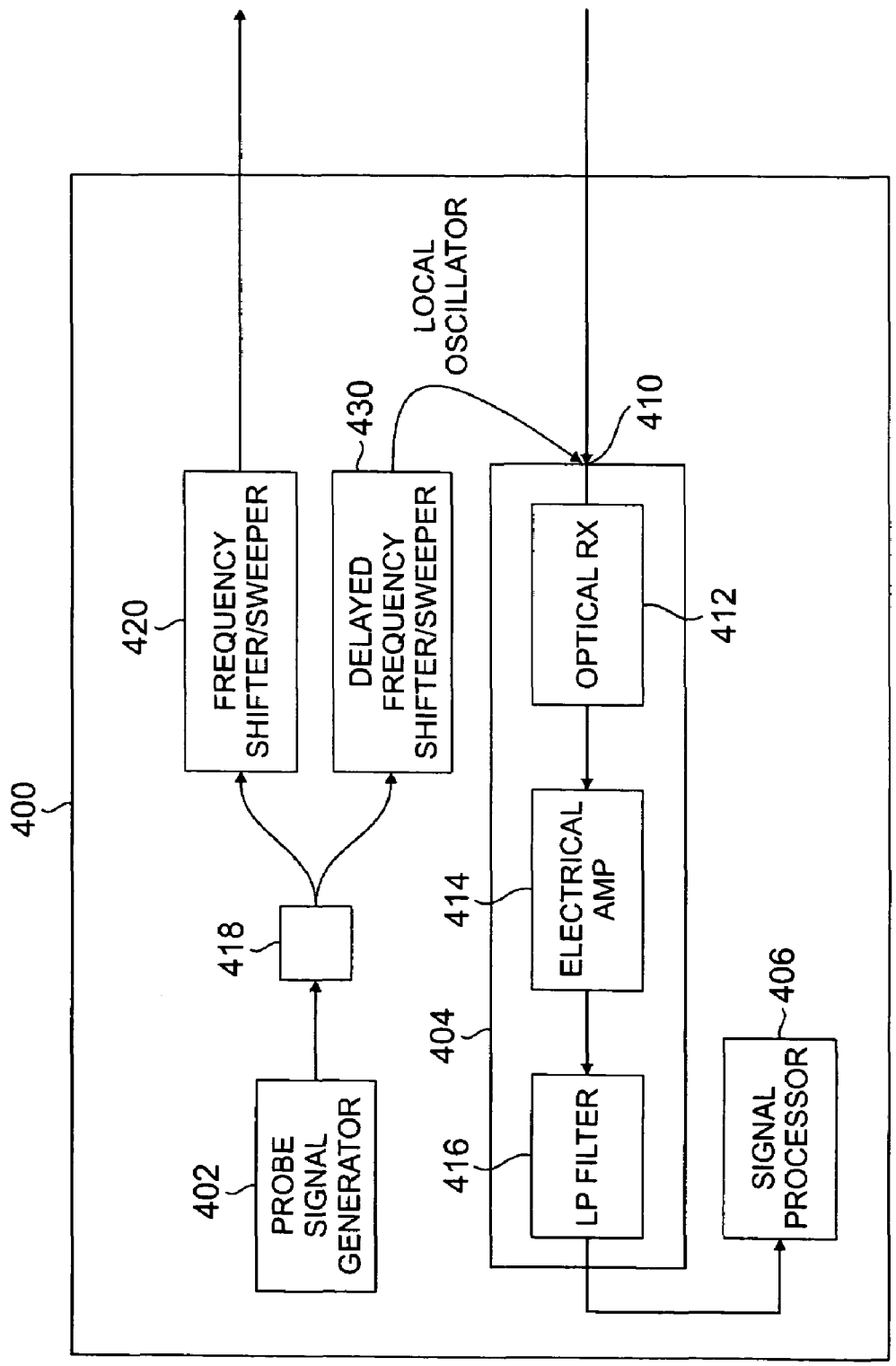
FIGS. 7-8 are block diagrams showing two embodiments of a COTDR arrangement constructed in accordance with FIG. 6.
Figure 8:
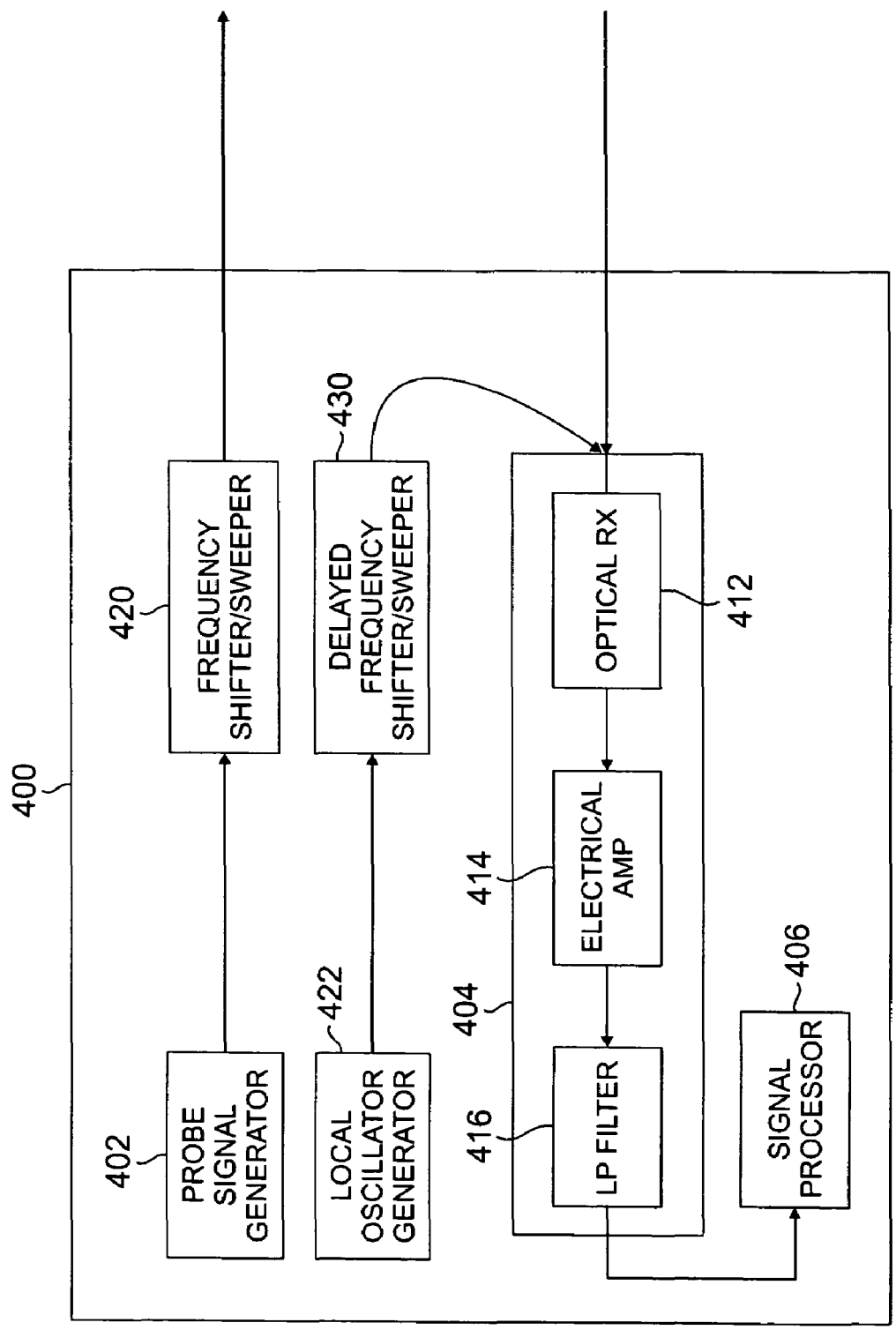

FIG. 7 shows one embodiment of COTDR units 305 and 307 that employ a receiver with a swept frequency receiver. As shown, COTDR unit 400 includes a COTDR probe signal generator 402, a modulator 420 to sweep the probe signal frequency, an optical homodyne detection type optical receiver 404, and signal processor 406. Optical homodyne detection type optical receiver 404 includes an optical fiber coupler 410, an optical receiver 412, an electrical amplifier 414, and a low pass filter 416. A modulator 430 is coupled to the branch port of the optical fiber coupler 410 and the branch port of the optical fiber coupler 418. The modulator 430 sweeps in frequency and delays in time the probe signal that is provided to the optical receiver 404 and which serves as a local oscillator. The embodiment of the invention shown in FIG. 8 is similar to the embodiment of FIG. 7, except that in FIG. 8 a separate local oscillator generator 422 provides the input signal to modulator 430.

Although various embodiments are specifically illustrated and described herein, it will be appreciated that modifications and variations of the present invention are covered by the above teachings and are within the purview of the appended claims without departing from the spirit and intended scope of the invention. For example, while the present invention has been described in connection with a COTDR arrangement, the invention may also be employed in other monitoring arrangements such as an OTDR arrangement.

What is claimed is:

1. A method of using COTDR with a bi-directional optical transmission system that includes first and second terminals interconnected by at least first and second unidirectional optical transmission paths having at least one repeater therein, said method comprising:
generating, by a signal generator, a continuous wave (cw) probe signal having a frequency that is swept by a modulator over a prescribed frequency range during a prescribed time period;
transmitting the cw probe signal over the first optical path;
receiving over the second optical path a returned COTDR signal in which status information concerning the first optical path is embodied; and
detecting a frequency within the prescribed frequency range of the returned COTDR signal to obtain status information.

2. The method of claim 1 wherein said prescribed time period is equal to a round trip transit time experienced by the cw probe signal traveling to a location along the optical transmission path that is to be monitored.

3. The method of claim 1 wherein said prescribed frequency range is equal to the product of a sweep rate at which the frequency of the cw probe signal is varied and said prescribed time period.

4. The method of claim 1 wherein said at least one repeater includes a rare-earth doped optical amplifier through which the optical probe signal is transmitted.

5. The method of claim 1 further comprising the step of transmitting the returned COTDR signals from the first optical path to the second optical path over an optical loopback path.

6. The method of claim 5 wherein said optical loopback path is located in said repeater.

7. The method of claim 1 wherein the status information includes discontinuities in the first optical path that gives rise to optical attenuation.

8. The method of claim 1 further comprising the step of transmitting optical traffic signals over the first optical path while performing the step of transmitting the cw probe signal over the first optical path.

9. The method of claim 8 wherein the traffic signals are located at one or more wavelengths outside of a waveband occupied by the cw probe signal.

10. The method of claim 8 wherein the traffic signals are located at one or more wavelengths sufficiently remote from a waveband occupied by the cw probe signal to reduce FWM and XPM so that both the quality of the optical traffic signals and COTDR sensitivity are maintained at acceptable levels.

11. In a bi-directional optical transmission system that includes first and second terminals interconnected by at least first and second unidirectional optical transmission paths having at least one repeater therein, a COTDR arrangement comprising:
a continuous wave (cw) light source for generating a cw probe signal having a frequency that is swept by a modulator over a prescribed frequency range during a prescribed time period, said cw light source being arranged to transmit the cw probe signal over the first optical path;
an optical receiver for receiving over the second optical path a returned COTDR signal in which status information concerning the first optical path is embodied and for detecting a frequency within the prescribed frequency range of the returned COTDR signal to obtain status information.

12. The COTDR arrangement of claim 11 wherein said prescribed time period is equal to a round trip transit time experienced by the cw probe signal traveling to a location along the optical transmission path that is to be monitored.

13. The COTDR arrangement of claim 11 wherein said prescribed frequency range is equal to the product of a sweep rate at which the frequency of the cw probe signal is varied and said prescribed time period.

14. The COTDR arrangement of claim 11 wherein said at least one repeater includes a rare-earth doped optical amplifier through which the optical probe signal is transmitted.

15. The COTDR arrangement of claim 11 further comprising an optical loopback path coupling the first optical path to the second optical path.

16. The COTDR arrangement of claim 15 wherein said optical loopback path is located in said repeater.

17. The COTDR arrangement of claim 11 wherein the status information includes discontinuities in the first optical path that gives rise to optical attenuation.

* * * * *